United States Patent [19]

Krieg

[11] 4,281,459
[45] Aug. 4, 1981

[54] NIBBLING TOOL

[75] Inventor: Adrian H. Krieg, Woodbridge, Conn.

[73] Assignee: Widder Corporation, Naugatuck, Conn.

[21] Appl. No.: 42,080

[22] Filed: May 24, 1979

[51] Int. Cl.³ .............................................. B26B 15/00
[52] U.S. Cl. ...................................... 30/228; 83/916
[58] Field of Search ................. 30/228, 241, 242, 243; 83/916

[56] References Cited

U.S. PATENT DOCUMENTS

| | | | |
|---|---|---|---|
| 3,025,600 | 3/1962 | Leibinger | 30/241 |
| 3,728,927 | 4/1973 | Pfleiderer | 83/916 X |
| 3,759,130 | 9/1973 | Patterson | 83/916 X |
| 3,785,052 | 1/1974 | Yermis | 30/241 |

*Primary Examiner*—Jimmy C. Peters
*Attorney, Agent, or Firm*—Kenneth J. Stempler

[57] ABSTRACT

A hand-held nibbling tool for sheet metal or other thin material is provided with a reciprocating punch which on its upward stroke moves the metal to be chipped against a readily replaceable cutting die positioned in a die holder attached to the lower end of the tool. The tool is provided with a conventional reciprocating mechanism driven in a known manner by a conventional air or electric motor. The reciprocating punch is connected to the reciprocating mechanism by a piston rod supported for a substantial part of its length in a sleeve within the die holder. The said die holder, moreover, is provided with one or more passages extending upwardly from the die and outwardly of the die holder so as to permit the chips thrown upwardly by the action of the punch against the die to be removed from the nibbling area. The die itself has an internal opening cooperating with the aforesaid passages. Means may also be provided for guiding the tool along a predetermined path in the sheet metal as nibbling proceeds; additional means may be provided for maintaining a proper relationship between the nibbling tool and the sheet metal to be cut for better control in the nibbling of thin sheets.

12 Claims, 14 Drawing Figures

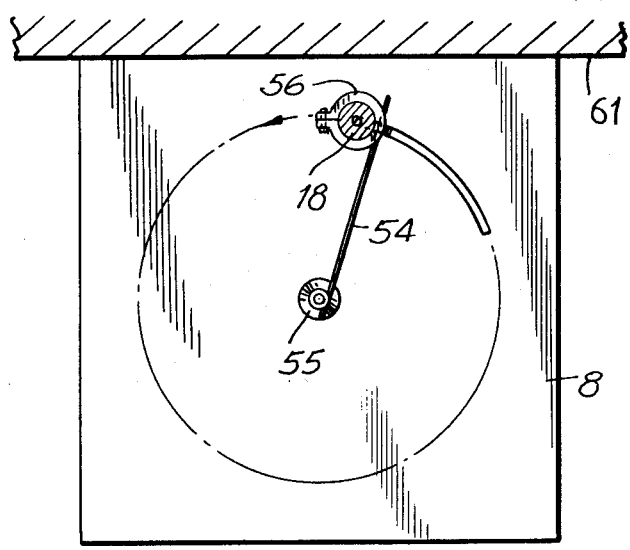
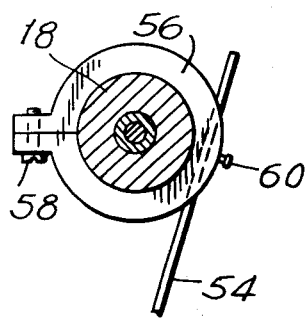
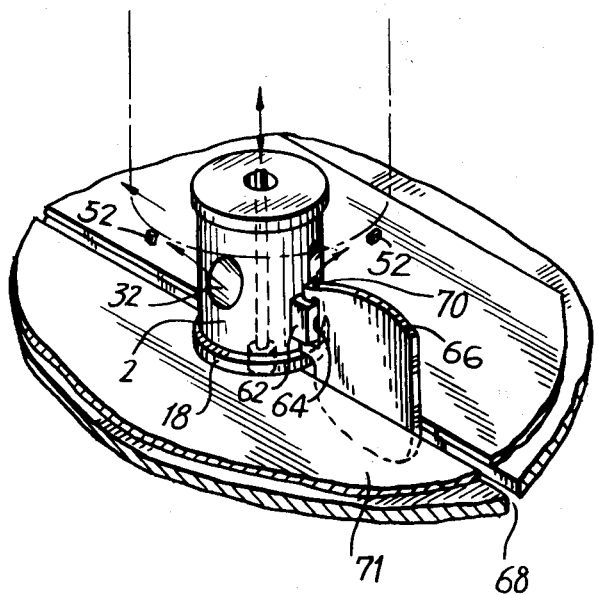
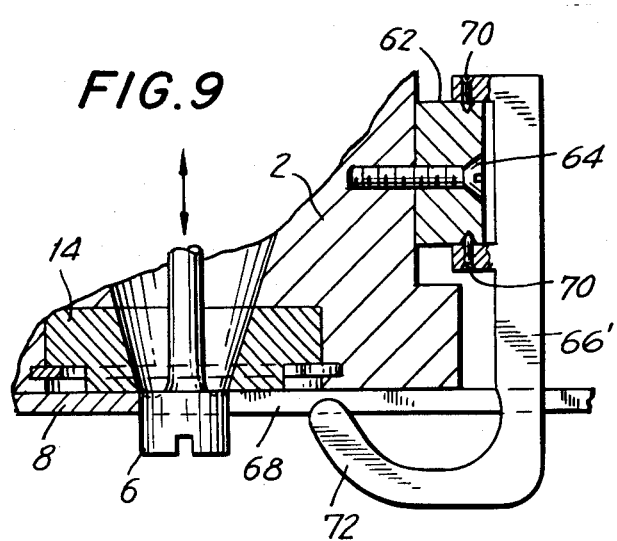
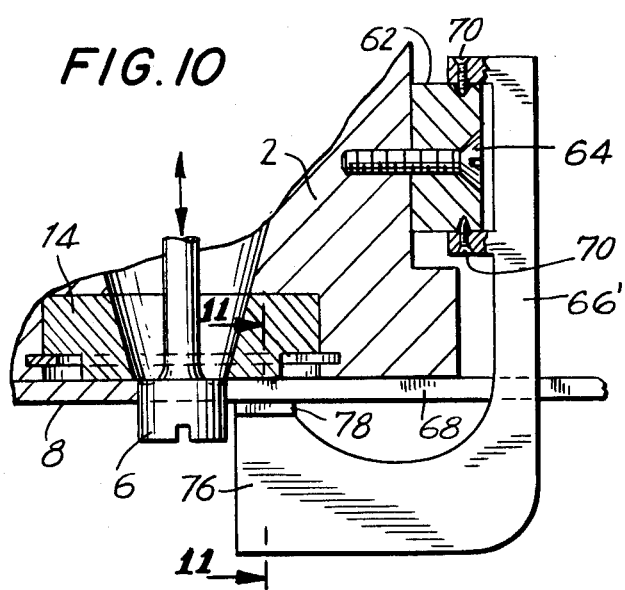
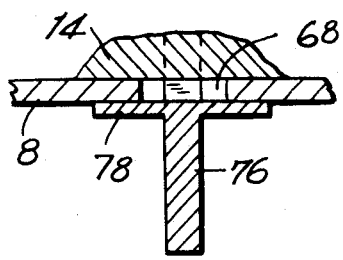

NIBBLING TOOL

BACKGROUND OF INVENTION

Of the various types of nibbling tools now available, there are those which may be classified as internal die carriers in which a punch pushes the metal against a sharp die positioned beneath the sheet metal to be cut. The tool comprising the punch and die is stationary, the sheet being moved along between the punch and die as nibbling progresses. Representative of such type of nibbling tools is the U.S. Pat. No. 3,958,479, to Leibinger issued May 25, 1976. Nibbling is accomplished in these tools by downward motion of the punch against the underlying die.

The art has also developed types of hand-held nibbling tools. Some of these, such as represented by U.S. Pat. No. 2,888,744 to Yermish issued June 2, 1959, have the nibbling die positioned beneath the sheet metal to be cut and operate upon the downstroke of the punch against the die. This type of tool, however, requires either that the nibbling action begin at an open edge of the sheet, or that a large opening be made in the sheet sufficient to accommodate the attached die.

A still further development in the art appears in U.S. Pat. No. 3,861,037 issued Jan. 21, 1975 to Smith et al. This nibbling tool operates on upward movement of the punch against the die positioned at the lower end of the tool, and permits start of the nibbling action in the center of a sheet solely by providing a small opening sufficient to receive the punch. The present invention is an improvement in the type of nibbling tool represented by said U.S. Pat. No. 3,861,037.

SUMMARY OF THE INVENTION

It is an object of the present invention to provide a simple form of nibbling tool adaptable for hand-held use which is capable of effecting a clean, sharp nibbling action in sheet metal, plastic or laminate material.

A tool for attaining such objective is provided with a readily replaceable die held above the material to be cut with a replaceable punch moving upwardly, forcing the material against the sharp edge of the die. Another object of the invention is to avoid accumulation of chips of material in the plunger-die area, by providing passageways adjacent thereto for displacement of such chips by virtue of the upward plunger action. Clean and sharp nibbling is thereby assured.

A further object of this invention is to provide a nibbling tool of the type described with means readily guiding the hand-held tool in a straight-line or circular course.

Another object of the invention is the provision of a nibbling tool for acting upon sheet material which is not only plane but which may also be corrugated or bent with C, Z and other various configurations.

Still another object of the present invention is the provision of a hand-held upwardly-cutting nibbling tool in which provision is made to assure that upwardly moving punch will begin its action beneath the material to be cut.

These and other advantages of the present invention would become apparent and will be described in the specification and claims which follow, and as illustrated in the accompanying drawings in which:

FIG. 6 is a plan view, partially in cross section, of an arrangement for guiding nibbling tool of the present invention in an arcuate cutting course;

FIG. 7 is an enlarged, cross-sectional view of a part of the guiding mechanism illustrated in FIG. 6;

FIG. 8 is a perspective view of another form of tool-guiding device;

FIG. 9 is an enlarged view, partially in cross section, of still another form of tool-guiding device;

FIG. 10 is an enlarged view, partially in cross section, of an alternative form of combined tool-guiding and sheet-supporting arrangement;

FIG. 11 is a partial cross-sectional view along the line 11—11 of FIG. 10;

Figure 1:
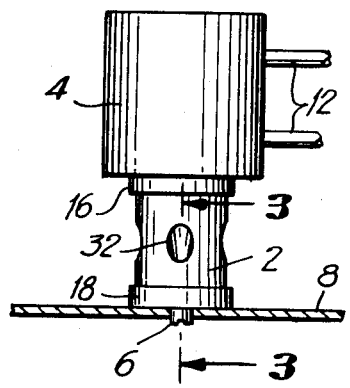
FIG. 1 is a vertical view of a nibbling tool assembly according to this invention, showing its relationship to the material to be cut.

In FIG. 1 there is broadly shown a nibbling tool according to the present invention in which a die holder 2 is attached in any suitable manner to the tool body 4 which may contain the source of reciprocating power for operating a punch 6. The tool is shown in its general relationship to the material to be worked upon, such as sheet metal 8. Details of the reciprocating mechanism and/or motor generally contained within or attached to tool body 4 may be those already known in the prior art such as in U.S. Pat. No. 3,861,037, supra, or U.S. Pat. No. 3,942,250 to Kurosaki issued Mar. 9, 1976 or similar equivalent reciprocating devices and form no part of the present invention and have not been illustrated; for example, although now shown in FIG. 1, the power source, such as the motor, may extend outwardly from the tool body 4, as in the aforesaid U.S. Pat. No. 3,861,037. Leads 12 may be provided for either air or electric power.

Figure 2:
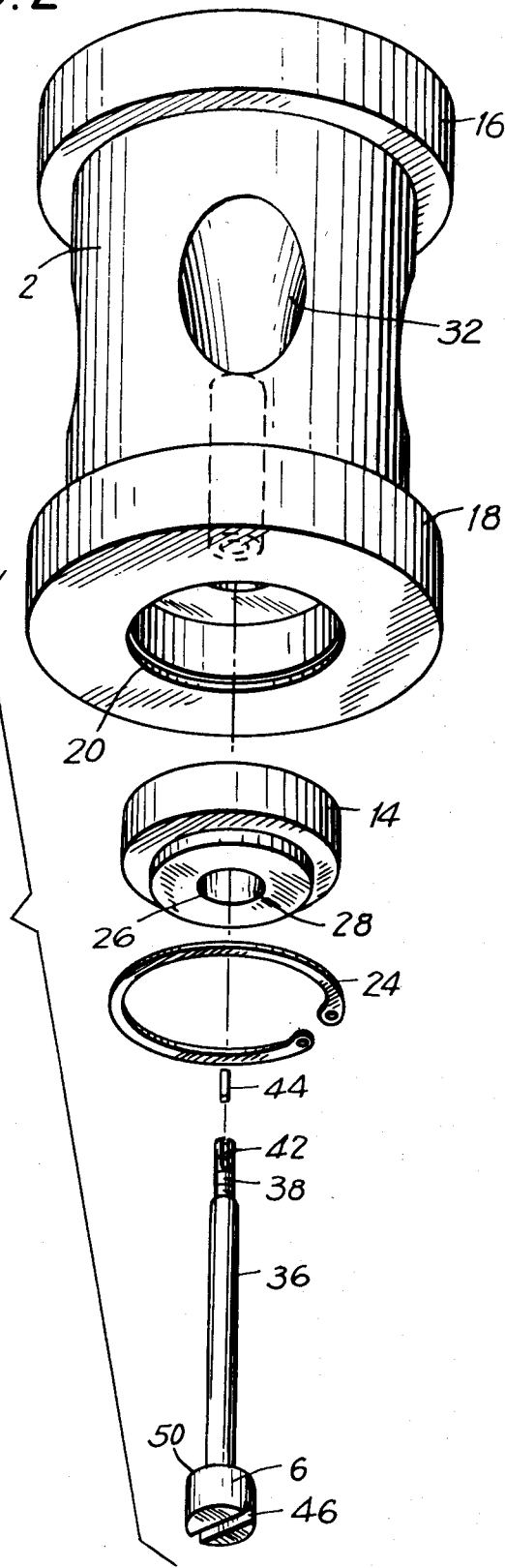
FIG. 2 is an enlarged exploded view, in perspective, illustrating the relationship between the die holder, die and punch, of the tool.
Figure 3:
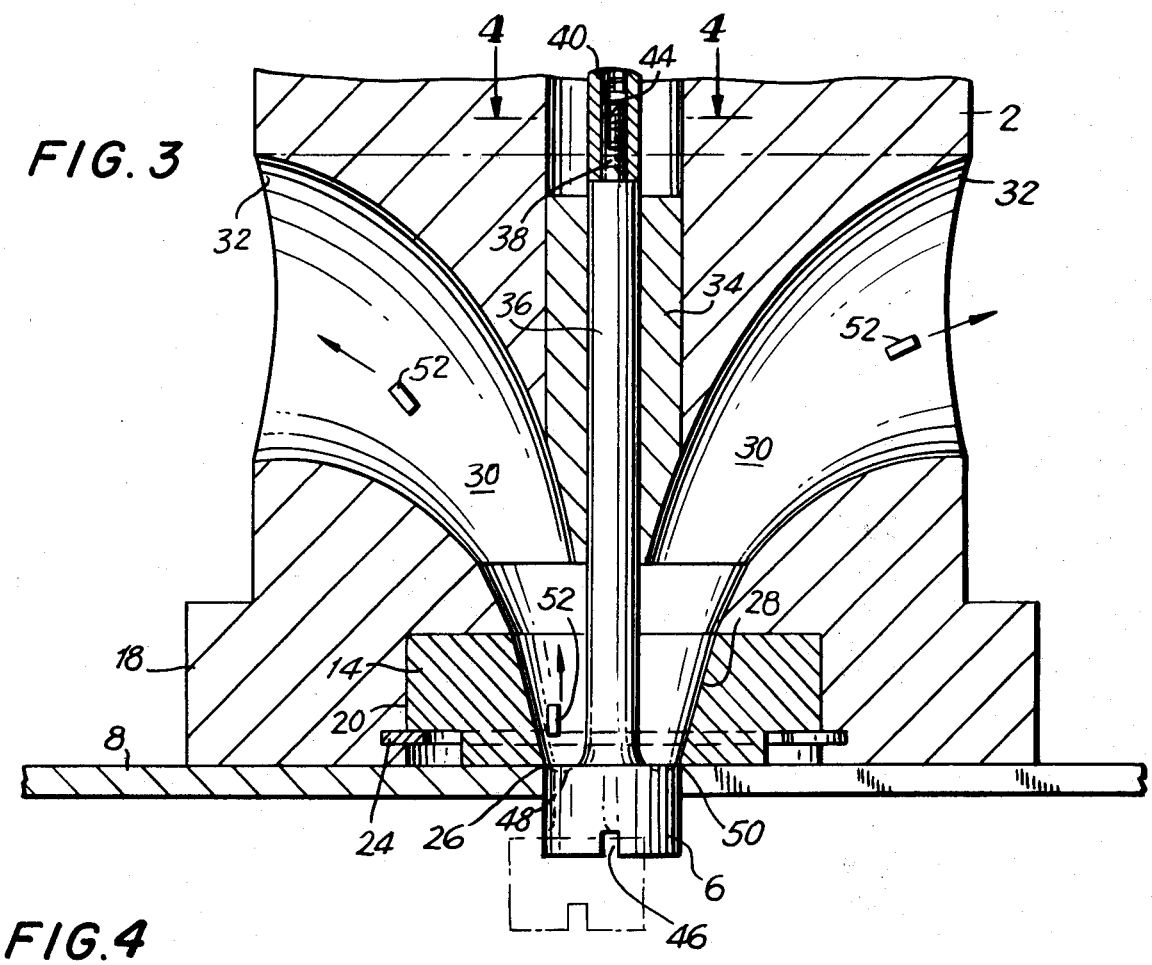
FIG. 3 is a partial, enlarged vertical cross section along the line 3—3 of FIG. 1.
Figure 4:
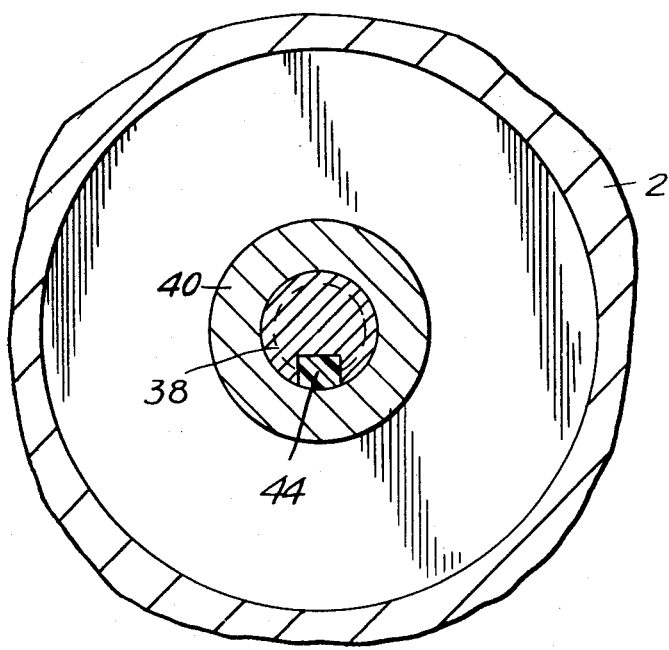
FIG. 4 is an enlarged horizontal cross section through the die holder along the line 4—4 of FIG. 3.

The novel relationship between the die holder 2, punch 6 and die 14 is more clearly shown in FIGS. 2, 3 and 4. Die holder 2 is preferably formed with radial end flanges 16 and 18, the former for attaching the same to the tool body 4 in any suitable manner (not shown), and the latter for supporting the tool on sheet metal 8. Within flange 18 there is provided an annular cut-out 20 for receiving die 14 held within the die holder 2 by suitable means such as spring ring 24, the lower edge of die 14, and more particularly cutting edge 26 lying flush with the lower surface of flange 18. Cutting edge 26 is actually the periphery of a central opening 28 within die 14, this opening communicating with one or more upwardly and outwardly extending passages 30 formed within die holder 2. These passages extend to external openings 32 in the die holder. In the preferred form of invention illustrated, there are four passages and four openings positioned at 90° from one another.

Punch 6 is mounted for reciprocating movement within die holder 2 by means of bearing sleeve 34 surrounding integral rod 36. A threaded extension 38 of rod 36 connects the rod to a portion of the reciprocating mechanism indicated at 40. In order to form a firm yet shock-resistant connection between rod 36 and mechanism 40, in a preferred form of invention illustrated threaded extension 38 is formed with a slot 42 into which is inserted a plug 44 of flexible material such as "Nicon". To assist in attaching punch 6 to mechanism 40, the underside of the punch is preferably slotted as at 46 to receive a suitable tool such as a screwdriver (not shown). The upper or working side of punch 6 may be formed with an annular depression 48 to provide a sharp shearing edge 50.

Operation of the aforedescribed nibbling tool is effected by reciprocating movement of punch 6 which shears or nibbles a thin section of sheet 8 by driving the same upwardly against the sharp die edge 26. The tool may be hand-held and nibbling of the sheet is started either from its outer edge or through a small opening in the sheet which need not be larger than the head of punch 6. Movement of the tool shifts the position of the punch and die as indicated by dotted lines in FIG. 3, each small movement shearing off small chips of metal. These chips 52 are thrown upwardly by the upward movement of punch 6 and will be thrown out of the die holder through passages 30 and openings 32. A build-up of chips about the working area of the tool is thus avoided.

An important feature of the nibbling tool forming the invention lies not only in its ease of operation, permitting the nibbling of corrugated as well as plane material, but in the simple manner in which die 14 is replaceably mounted in die holder 2, i.e., the mere removal and replacement of spring ring 24. Likewise, the punch 6 is readily replaced as desired by unscrewing and screwing the same on to the reciprocating mechanism.

Figure 5:
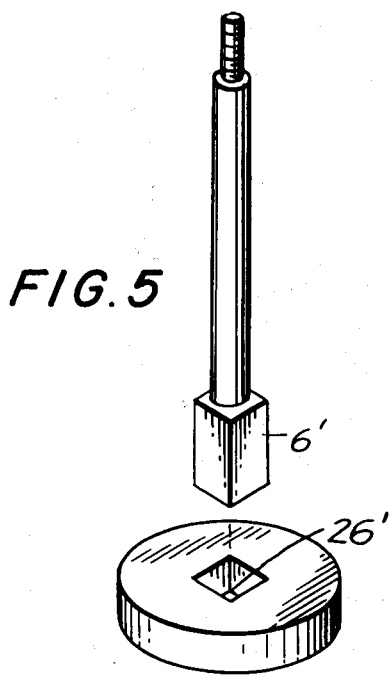
FIG. 5 is a perspective view showing an alternative form of die and punch.

While the form of invention shown in FIGS. 1-4 contemplates the use of a round punch cooperating with a round die, a square punch 6' working with a die having a square edge 26', all as shown in FIG. 5, has been found useful for nibbling certain materials.

The design of the nibbling tool according to this invention, in addition to the advantages already described, lends itself to uses not previously possible with tools of the prior art. In FIGS. 6 and 7, for example, there is illustrated the manner of nibbling a circular cut-out in a piece of sheet metal. At the center of the desired circle, a guide rod 54 is pivotally supported at one end in any suitable well-known manner to fixture 55 preferably provided with a magnetic base (not shown) holding it in place on sheet metal piece 8. A collar 56 is attached to die holder 2 preferably by tightening it about end flange 18 as by screw 58, said collar being provided with an opening for receiving the other end of rod 54 as shown in FIG. 7. At the desired radius, rod 54 is firmly attached to collar 56 as by set screw 60. In the event the material to be nibbled is not sheet metal, fixture 55 could be fixed to the material in any other suitable manner as in a hole therethrough. A suitable collar such as 56 could be attached to the body of the die holder rather than flange 18, so long as it does not interfere with openings 32.

To effect operation of the arrangement illustrated in FIGS. 6 and 7, it is only necessary to first determine the center of the desired cut-out, and at the desired radius punch a small hole for receiving the tool punch. The magnetic pivot is then placed at the designated center and the tool with attached collar placed over the punched hole. Guide rod 54 is then tightened to the collar, as described, and nibbling then proceeds in the desired arcuated path as determined by the then fixed effective length of the guide rod.

Nibbling of an arcuate path is sometimes best accomplished by holding the sheet metal against a vertical support or wall 61 (FIG. 6). If the tool is provided with a long horizontally extending motor such as used in U.S. Pat. No. 3,861,037, circular movement of the tool may be impeded by the supporting wall; in such event collar 56 may be loosened sufficiently to permit rotation of the tool within the collar.

Straight nibbling of material can readily be obtained by the tool of the present invention by providing the same with a guide or rudder, as shown in FIG. 8. A suitable support 62 is attached to the outer wall of die holder, preferably above flange 18, as by screw 64. Rudder 66, preferably the width of the desired cut 68, is mounted on support 62 as by screws 70. Instead of rudder 66 having a long trailing portion as in FIG. 8, it may have a forwardly extending guide section 72 as shown for rudder 66' in FIG. 9. The use of a rudder or guide is of particular assistance when used with a template 71 as shown in FIG. 8.

In nibbling long cuts in thin flexible or corrugated sheets, it is sometimes difficult with a hand tool to determine whether or not the punch actually extends beneath the material at its lowest stroke. One way of more accurately holding the hand tool in the proper relative vertical position is to provide the rudder or guide such as 66' with a forwardly and upwardly extending portion 76 having an outwardly extending flange 78 at its upper end, the vertical distance from the upper surface of the flange to the bottom of die 14 being slightly greater than the thickness of the material to be nibbled. This assures that as the tool is moved along, the punch 6 at the lower end of its stroke will always be below the bottom of the material 8 and ready to punch upwardly against the cutting edge of die 14. The transverse width of flange 78 need only be slightly larger than the width of the cut 68.

Figure 12:
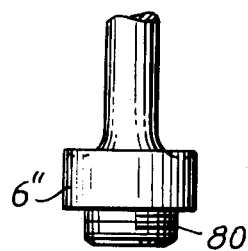
FIG. 12 is a vertical view of a modified form of tool punch.
Figure 13:
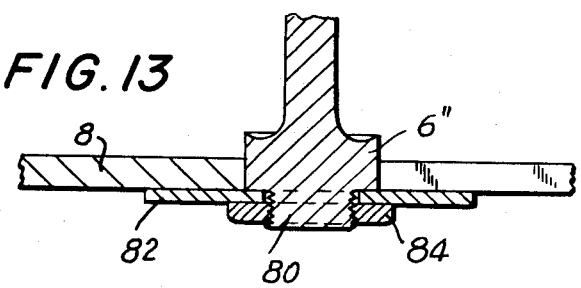
FIG. 13 is a vertical cross-sectional view of the punch of FIG. 12 showing a relationship to the material to be nibbled.
Figure 14:
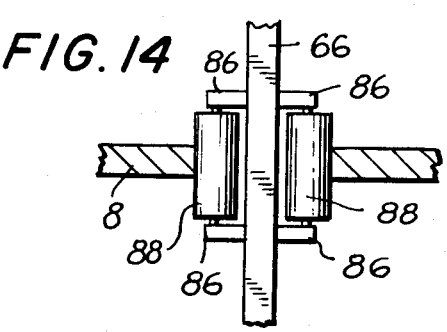
FIG. 14 is an enlarged view of the detail of a tool-guiding arrangement which may be utilized with the forms of invention shown in FIGS. 8, 9 and 10.

Another manner for even more positively guiding the tool operator to maintain the punch below the undersurface of the material is illustrated in FIGS. 12 and 13 in which punch is provided with a threaded extension 80 and means such as a washer 82 wider than the width of the nibbled cut is held against the lower surface of the punch as by nut 84.

If the cut to be nibbled is a large one and accuracy of a straight line cut is important, the rudder or guide may be provided with flexible rollers contacting the sides of the cut, as shown in FIG. 11. As there illustrated, guide 66, for example, has attached thereto on either side, as by supports 86, a pair of vertically mounted rollers 88 preferably formed of semiflexible material such as hard rubber, firmly engaging the sides of the cut in sheet material 8. The roller fixture of FIG. 11 is adaptable for use with any of the guides or rudders of FIGS. 8, 9 or 10.

While an advantage of the nibbling tool according to the present invention lies in the fact that nibbling may be started anywhere in the sheet to be cut, obviously if the attachments such as shown in FIGS. 8, 9, 10, 11 and 14 are to be used, a cut of some length has to be made before the attachments can be added, or else nibbling must start from the outer end of the sheet. The form of invention shown in FIGS. 12 and 13 requires nibbling from the outer edge.

While my invention has been described by reference to certain specific embodiments, as illustrated, it will be clear to those skilled in this art that it may vary in details without departing from the basic principles thereof. The relative size of die holder and tool is illustrative only; while the shape of the die holder has been shown as generally cylindrical, it may have other outer configurations, for example barrel-shaped; details of the attachment of parts such as the manner of mounting the rudder or guide to the die holder, the formation of guiding flange 78, mounting of guide 82, and the attachment of rollers 88 are likewise illustrative only.

Accordingly, the foregoing description of my invention is intended to be limited only as set forth in the claims which follow.

I claim:

1. In a nibbling tool of the type in which a reciprocating mechanism operates a reciprocating punch to force sheet material to be cut against a die, the improvement comprising a die holder attached at one end to the tool and its other end having a plane surface adapted to contact the surface of said material, said die holder having one or more external openings intermediate its ends, a die having a central opening forming a cutting edge, means mounting said die within said die holder with its cutting edge flush with the material-contacting surface of said die holder, a punch, and means within said die holder slidably supporting said punch in operable relationship with said reciprocating mechanism for reciprocal motion toward and away from said die and centrally of said die, so that the upper edge of said punch in its uppermost position is coincident with the cutting edge of said die and in its lowermost position is adapted to protrude beyond the thickness of the material to be nibbled, the means for slidably supporting said punch comprising a rod attached at one end to said punch and at the other to the reciprocating mechanism, the cutting surface of said punch extending laterally from said rod and completely surrounding the circumference of said rod to allow nibbling to occur regardless of the direction in which the tool is moved, said die holder being provided with one or more internal passageways communicating at their lower end with the central opening of said die and at their upper end communicating with the openings in the surface of said die holder.

2. The improvement in a nibbling tool according to claim 1, in which said die holder is provided with a recess in its said other end and an internal groove in said recess adjacent to but spaced from the said plane surface thereof, in which said die is provided with an enlarged portion spaced from its cutting edge and fitted snugly in said recess, and in which the means for mounting said die within said die holder comprises removable resilient means pressing against the enlarged portion of said die and extending outwardly into said internal groove.

3. The improvement of a nibbling tool according to claim 1, the rod attached at one end to said punch having a threaded extension on its other end, and in which said reciprocating means is provided with an internally threaded portion into which the threaded end of said rod is adapted to be screwed.

4. The improvement in a nibbling tool according to claim 3, in which the threaded extension of said rod is provided with a vertical slot, in combination with flexible material in said slot intermediate said threaded extension and the internal threaded portion of said reciprocating means.

5. The improvement in a nibbling tool according to claim 3, in combination with a bearing sleeve within said die holder surrounding said rod.

6. The improvement in a nibbling tool according to claim 3, in which the lower end of said punch is provided with a transverse slot adapted to receive a tool for attaching and detaching said punch with its threaded extension to said reciprocating mechanism.

7. The improvement in a nibbling tool according to claim 1, in which the central opening in said die and the outer surface of said punch are circular.

8. The improvement in a nibbling tool according to claim 1, in which the central opening of said die and the outer surface of said punch are square.

9. The improvement in a nibbling tool according to claim 1, in which said punch is provided with a threaded extension of smaller diameter than the area of said punch, in combination with a washer having a diameter greater than the lower surface of said punch mounted on said extension, and a nut holding said washer against the lower surface of said punch.

10. The improvement in a nibbling tool according to claim 1, in which the upper surface of said punch is formed with a depressed portion extending outwardly and upwardly to form the said upper edge coacting with the cutting edge of said die.

11. In a nibbling tool of the type in which a reciprocating mechanism operates a reciprocating punch to force sheet material to be cut against a die, the improvement comprising a die holder attached at one end to the tool and its other end having a plane surface adapted to contact the surface of said material, said die holder having one or more external openings intermediate its ends, the die holder being provided with a recess in its said other end and an internal groove in said recess adjacent to but spaced from the said plane surface thereof, in which said die is provided with an enlarged portion spaced from its cutting edge and fitting snugly in said recess, and in which the means for mounting said die within said die holder comprises removable resilient means pressing against the enlarged portion of said die and extending outwardly into said internal groove, a die having a central opening forming a cutting edge, means mounting said die within said die holder with its cutting edge flush with the material-contacting surface of said die holder, a punch, and means within said die holder slidably supporting said punch in operable relationship with said reciprocating mechanism for reciprocal motion toward and away from said die and centrally of said die, so that the upper edge of said punch in its uppermost position is coincident with the cutting edge of said die and in its lowermost position is adapted to protrude beyond the thickness of the material to be nibbled, said die holder being provided with one or more internal passageways communicating at their lower end with the central opening of said die and at their upper end communicating with the openings in the surface of said die holder.

12. In a nibbling tool of the type in which a reciprocating mechanism operates a reciprocating punch to force sheet material to be cut against a die, the improvement comprising a die holder attached at one end to the tool and its other end having a plane surface adapted to contact the surface of said material, said die holder having one or more external openings intermediate its ends, the means for slidably supporting said punch comprising a rod attached at one end to the punch and at the other to the reciprocating mechanism, said rod having a threaded extension on its other end, the lower end of said punch having a transverse slot adapted to receive a tool for attaching and detaching said punch with its threaded extension to said reciprocating mechanism, a die having a central opening forming a cutting edge, means mounting said die within said die holder with its cutting edge flush with the material-contacting surface of said die holder, a punch, and means within said die holder slidably supporting said punch in operable relationship with said reciprocating mechanism for reciprocal motion toward and away from said die and centrally of said die, so that the upper edge of said punch in its uppermost position is coincident with the cutting edge of said die and in its lowermost position is adapted to protrude beyond the thickness of the material to be nibbled, said die holder being provided with one or more internal passageways communicating at their lower end with the central opening of said die and at their upper end communicating with the openings in the surface of said die holder.

* * * * *